US008782674B2

(12) United States Patent  (10) Patent No.: US 8,782,674 B2
Colombo et al.  (45) Date of Patent: *Jul. 15, 2014

(54) WAIT ON ADDRESS SYNCHRONIZATION INTERFACE

(71) Applicant: Microsoft Corporation, Redmond, WA (US)

(72) Inventors: Gregory J. Colombo, Redmond, WA (US); Hari Pulapaka, Redmond, WA (US); Neill M. Clift, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/932,935

(22) Filed: Jul. 1, 2013

(65) Prior Publication Data

US 2013/0298143 A1  Nov. 7, 2013

Related U.S. Application Data

(63) Continuation of application No. 12/958,721, filed on Dec. 2, 2010, now Pat. No. 8,490,118.

(51) Int. Cl.
*G06F 3/00* (2006.01)
*G06F 9/44* (2006.01)
*G06F 9/46* (2006.01)
*G06F 13/00* (2006.01)

(52) U.S. Cl.
USPC .......... 719/328; 719/320; 719/100; 719/102; 719/170

(58) Field of Classification Search
None
See application file for complete search history.

(56) References Cited

U.S. PATENT DOCUMENTS

| 5,659,709 A | 8/1997 | Quach |
| 6,128,640 A | 10/2000 | Kleinman |
| 8,490,118 B2 | 7/2013 | Colombo et al. |
| 2007/0157200 A1 | 7/2007 | Hopkins |
| 2008/0270812 A1 | 10/2008 | Sangili et al. |
| 2009/0199029 A1 | 8/2009 | Arimilli et al. |
| 2010/0169895 A1 | 7/2010 | Dice et al. |
| 2012/0144406 A1 | 6/2012 | Colombo et al. |

FOREIGN PATENT DOCUMENTS

| CN | 101542412 | 9/2009 |
| CN | 102541661 | 7/2012 |

OTHER PUBLICATIONS

"Condition Variable", Retrieved from: <http://www.elcel.com/docs/opentop/API/ot/ConditionVariable.html> on Sep. 9, 2010, 4 pages.
"Notice of Allowance", U.S. Appl. No. 12/958,721, (Mar. 14, 2013),16 pages.
"Supplemental Notice of Allowance", U.S. Appl. No. 12/958,721, (May 17, 2013), 4 pages.

(Continued)

*Primary Examiner* — H S Sough
*Assistant Examiner* — Craig Dorais
(74) *Attorney, Agent, or Firm* — John Jardine; Andrew Sanders; Micky Minhas

(57) ABSTRACT

In a first thread of a process a determination is made that a current value at a target address is not a desired value. In response to this determination, a first application programming interface (API) is invoked to indicate that the first thread is to sleep and be woken up when a second thread modifies the value at the target address. When a second thread modifies the value at the target address, the second thread invokes a second API to indicate that the value at the target address has been modified. In response to the second API being invoked, the first thread is woken up.

20 Claims, 5 Drawing Sheets

(56) References Cited

OTHER PUBLICATIONS

"Thread Specific Global", Retrieved from: <http://www.eggheadcafe.com/community/aspnet/2/26559/thread-specific-global.aspx> on Sep. 9, 2010, (Jul. 11, 2005), 3 pages.

Dudnick, Polina et al., "Condition Variables and Transactional Memory: Problem or Opportunity?", *In Proceedings of TRANSACT 2009*, Available at <http://www.cs.wisc.edu/multifacet/papers/TM_ConditionVariables.pdf>,(Feb. 15, 2009), 10 pages.

Walker, W.M. "An Experimental Testbed for Embedded Real Time Ada 95", *Proceedings of the Ninth International Workshop on Real-time Ada*, Available at <http://citeseerx.ist.psu.edu/viewdoc/download?doi=10.1.1.26.206&rep=rep1&type=pdf>,(1999), 6 pages.

Wienholt, Nick "Simplified Thread Synchronization in Windows Vista", Retrieved from: <http://www.codeguru.com/cpp/w-p/vista/print.php/c13387> on Sep. 9, 2010, (Mar. 5, 2007), 2 pages.

"Foreign Office Action", CN Application No. 201110395062.3, Jan. 16, 2014, 13 Pages.

WAIT ON ADDRESS SYNCHRONIZATION INTERFACE

RELATED APPLICATIONS

This application is a continuation of U.S. patent application Ser. No. 12/958,721, filed Dec. 2, 2010, entitled "Wait On Address Synchronization Interface", the entire disclosure of which is hereby incorporated by reference herein in its entirety.

BACKGROUND

Computer software applications are oftentimes run as processes that include multiple different threads, with each thread performing particular tasks or carrying out particular functionality of the application. These multiple threads are typically scheduled to run at different times on a processor. A thread is put to sleep when it is not scheduled to run, and then woken up when it is scheduled to run. Although running programs with different threads can have performance improvements, it is not without its problems. One such problem is that situations can arise where a thread is waiting for a particular variable to have a particular value, and does not proceed until that particular variable has that particular value. This can result in the thread being repeatedly woken up to run, only to have the thread be put back to sleep because that particular variable does not yet have that particular value. Such results can lead to inefficient scheduling of threads and reducing the performance of the computer running the application.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a first application programming interface is exposed that, when invoked by a first thread of a process, receives from the first thread both a target address and a current value observed by the first thread at the target address. A record of both the first thread and the target address is maintained, allowing the first thread to be identified if a value at the target address is subsequently modified. Additionally, the first thread is put to sleep in response to the first application programming interface being invoked.

In accordance with one or more aspects, in a first thread of a process a determination is made that a current value at a target address is not a desired value. In response to the current value at the target address not being the desired value, a first application programming interface is invoked to indicate that the first thread is to sleep and be woken up when a second thread modifies the value at the target address. Invoking the first application programming interface includes identifying both the target address and the current value as parameters of the first application programming interface.

BRIEF DESCRIPTION OF THE DRAWINGS

The same numbers are used throughout the drawings to reference like features.

DETAILED DESCRIPTION

A wait on address synchronization interface is discussed herein. A wait synchronization module exposes two application programming interfaces (APIs) to processes running on a computing device: a Wait On Address API and a Wake Address API. The Wait On Address API is invoked by a thread of a process, the thread identifying both a target address and a value observed by the thread at the target address. The Wait On Address API allows the thread to indicate that it is relinquishing control of the processor (e.g., is going to sleep) until the value at the target address changes. The wait synchronization module verifies that the target address still has the value identified by the thread. If the target address no longer has the value identified by the thread, then the thread is not put to sleep, and an indication is returned to the thread that the value at the target address has changed. However, if the target address still has the value identified by the thread, then the thread is put to sleep. The wait synchronization module maintains a record of the thread to indicate that the thread is waiting on the value at the target address to change. This record includes an indication of both the thread and the target address (which is the address on which the thread is waiting).

When a thread modifies the value at the target address, this modifying thread invokes the Wake Address API, specifying the address that was modified. The wait synchronization module checks its record to determine if any threads are waiting on that target address, and if one or more threads are waiting on that target address then the wait synchronization module wakes up at least one of those one or more threads.

Putting threads to sleep and waking up threads are discussed herein. Although the concepts of putting threads to sleep and waking up threads are well known to those skilled in the art, a brief discussion of putting threads to sleep and waking up threads is included here for the convenience of the reader. Generally, an operating system includes a module or component, such as a thread scheduling module, that schedules different threads of a process for execution by a processor or processor core at different times. Typically, the thread is scheduled for an amount of time (e.g., referred to as a time slice) during which it can execute. After that amount of time elapses, the thread scheduling module schedules another thread to execute. When a thread is put to sleep, the thread scheduling module does not schedule the thread for execution, and the thread does not execute, while the thread is sleeping. When the thread is woken up, the thread scheduling module resumes scheduling the thread for execution and the thread executes.

Figure 1:
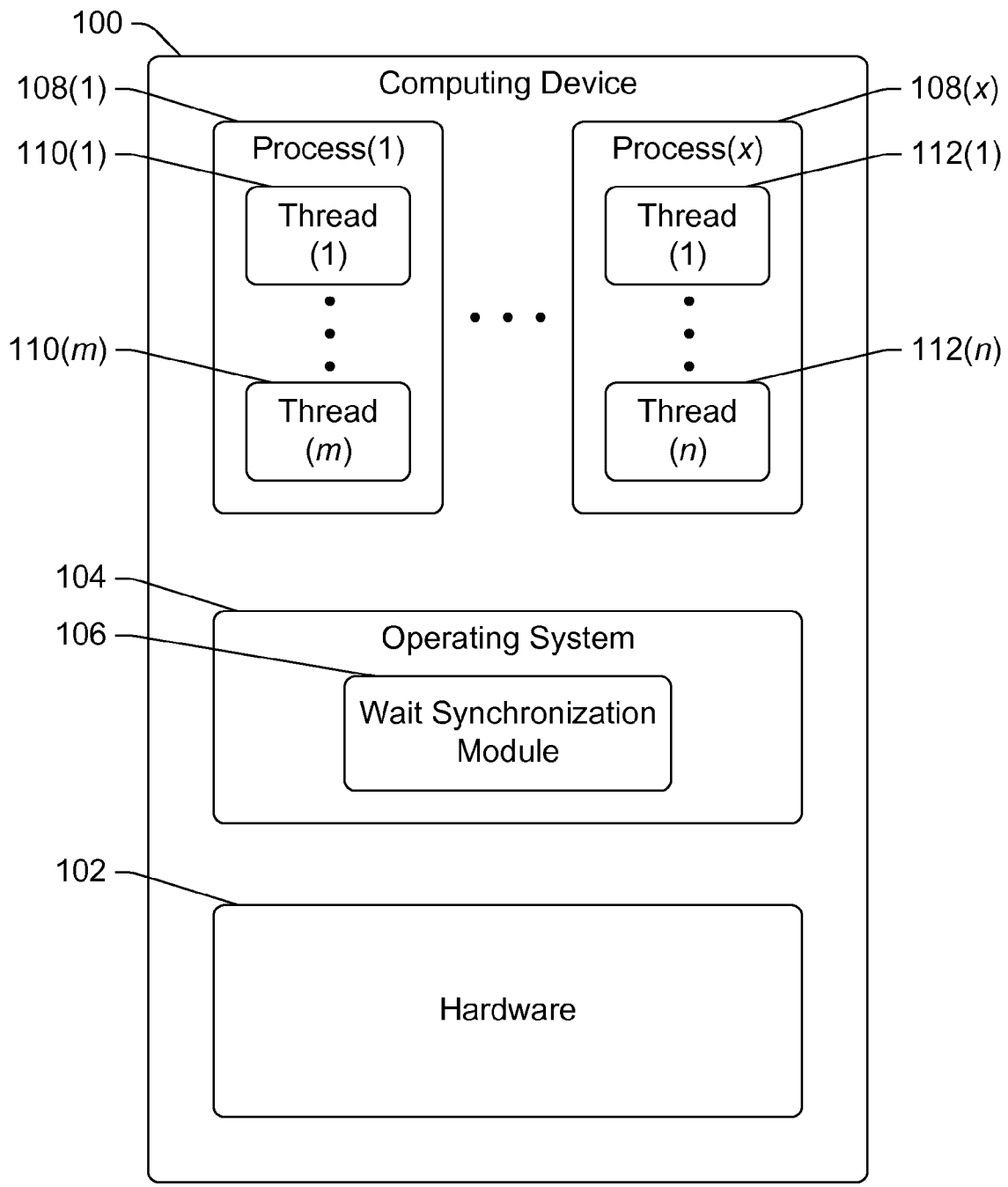
FIG. 1 is a block diagram illustrating an example computing device implementing the wait on address synchronization interface in accordance with one or more embodiments.

FIG. 1 is a block diagram illustrating an example computing device 100 implementing the wait on address synchronization interface in accordance with one or more embodiments. Computing device 100 can be a variety of different types of devices. For example, computing device 100 can be a desktop computer, a netbook or laptop computer, a notepad or tablet computer, a mobile station, an entertainment appliance, a set-top box communicatively coupled to a display device, a television, a cellular or other wireless phone, a game console, an automotive computer, and so forth. Thus, computing device 100 may range from a full resource device with substantial memory and processor resources (e.g., personal computers, game consoles) to a low-resource device with limited memory and/or processing resources (e.g., traditional set-top boxes, hand-held game consoles).

Computing device 100 includes hardware 102, an operating system 104 that includes a wait synchronization module 106, and one or more (x) processes 108(1), . . . , 108(x). Processes 108 can each include one or more threads, and different processes 108 can include different numbers of threads. For example, process 108(1) is illustrated as including one or more (m) threads 110(1), . . . , 110(m), and process 108(x) is illustrated as including one or more (n) threads 112(1), . . . , 112(n).

Hardware 102 includes various hardware components of a computing device. For example, hardware 102 can include one or more processors, memory components (e.g., random access memory (RAM), read only memory (ROM), etc.), input components such as keyboards or motion sensors, output components such as speakers or display screens, and so forth. Hardware 102 supports execution of operating system 104, which is typically implemented in software and/or firmware.

Operating system 104 manages the execution of applications on computing device 100, which are referred to as processes 108. Operating system 104 can be any of a variety of different operating systems. Operating system 104 includes a wait synchronization module 106 that implements the wait on address synchronization interface discussed herein, exposing the wait on address synchronization interface to the various processes 108. Although wait synchronization module 106 is illustrated as being implemented in operating system 104, alternatively wait synchronization module 106 can be implemented in hardware 102.

Figure 2:
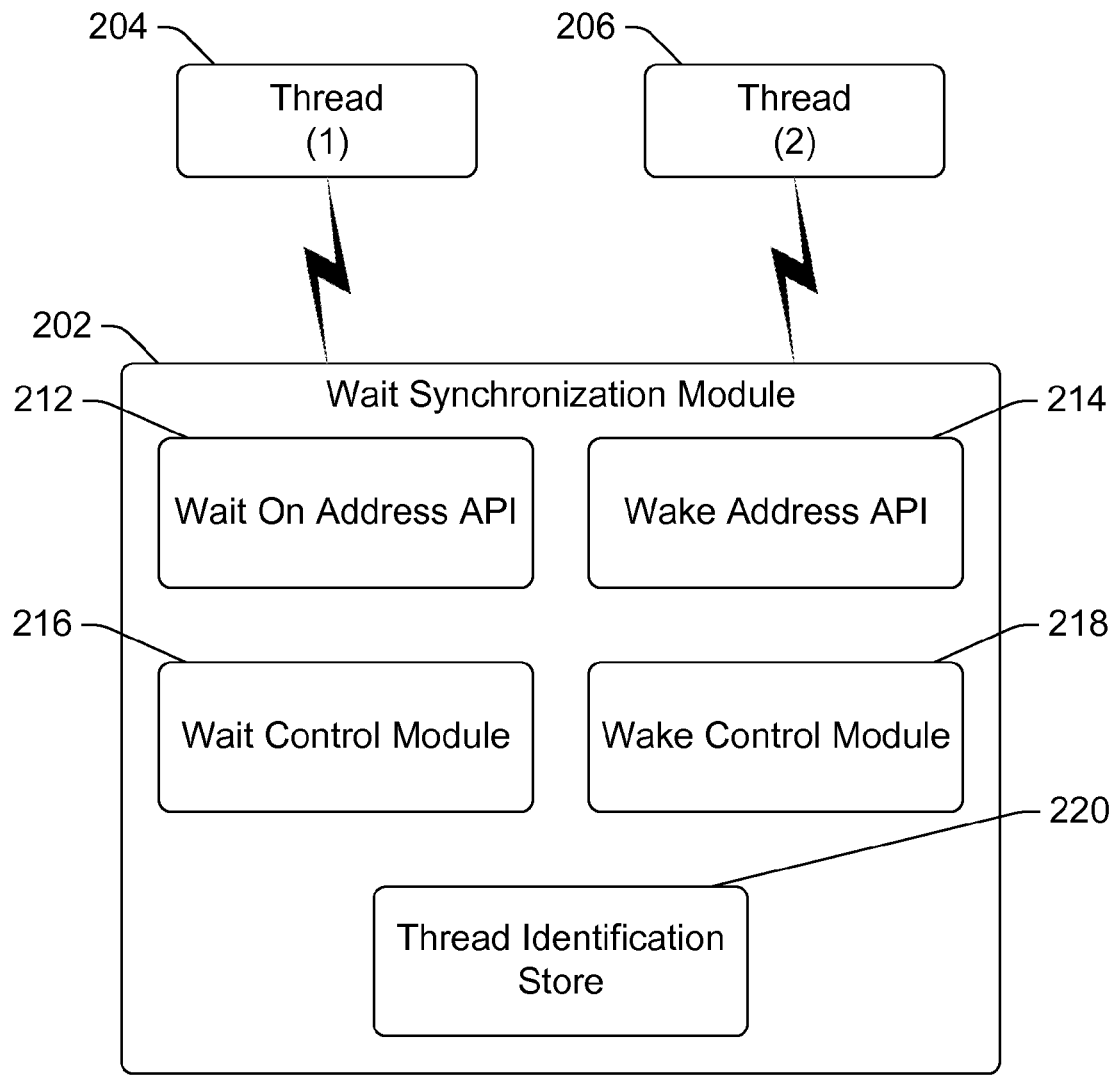
FIG. 2 is a block diagram illustrating an example system implementing the wait on address synchronization interface in accordance with one or more embodiments.

FIG. 2 is a block diagram illustrating an example system 200 implementing the wait on address synchronization interface in accordance with one or more embodiments. System 200 is implemented in a computing device, such as computing device 100 of FIG. 1. System 200 includes a wait synchronization module 202, which can be wait synchronization module 106 of FIG. 1. System 200 also includes a thread 204 and a thread 206, each of which can be a thread 110 or 112 of FIG. 1. Threads 204 and 206 can be part of the same process (e.g., the same process 108 of FIG. 1), or alternatively parts of different processes (e.g., different processes 108 of FIG. 1).

Although system 200 is discussed with reference to threads 204 and 206, it is to be appreciated that various other threads can wait (optionally concurrently with thread 204 and/or thread 206) on the value for the same or different memory locations to be modified, and that various other threads can change the value at those particular memory locations. It should be noted that a developer of the process or processes including threads 204 and 206 is expected to take care to avoid a deadlock situation in which two threads are each waiting on the other to change a value of a memory location.

Wait synchronization module 202 includes a Wait On Address API 212 and a Wake Address API 214 that module 202 exposes to threads 204 and 206. Wait synchronization module 202 also includes a wait control module 216, a wake control module 218, and a thread identification store 220.

Wait synchronization module 202 synchronizes different threads (e.g., threads 204 and 206), allowing one thread that is waiting for a value at a memory location to be changed to go to sleep and subsequently be woken up when the value at that memory location is changed by another thread.

When executing, a thread 204 or 206 can desire that a value stored at a particular memory location, typically identified by the address of that memory location, has a particular value or range of values. The thread 204 or 206 reads the value at that particular memory location and checks whether the value stored at that particular memory location has the desired value or is within the desired range of values, and if so then proceeds with its operation. However, if the thread 204 or 206 determines that the value stored at that particular memory is not the desired value or is not within the desired range of values, then the thread 204 or 206 notifies wait synchronization module 202 that the thread 204 or 206 desires to wait on that memory location, and be notified when the value at that memory location is changed or modified. A thread waiting to be notified by wait synchronization module 202 when the value at a memory location changes or is modified is also referred to as a waiting thread.

The waiting thread notifies wait synchronization module 202 that it desires to wait on that memory location by invoking Wait On Address API 212. As part of invoking Wait On Address API 212, the waiting thread identifies, as one or more parameters of Wait On Address API 212, both a target address and a current value. The actual target address and/or current value can be included as parameters of Wait On Address API 212, or alternatively pointers or references to the target address and/or current value can be included as parameters of Wait On Address API 212. The target address is the address of the memory location that the waiting thread is waiting on, and the current value is the value observed by the waiting thread as being stored at the target address (which is the value read by the thread from the target address).

Wait On Address API 212 provides the received parameters to wait control module 216. In response to Wait On Address API 212 being invoked, wait control module 216 stores a record of the waiting thread in thread identification store 220. The record of the waiting thread includes both an identification of the waiting thread and an indication of the target address. The identification of the waiting thread is received from the waiting thread when the Wait On Address API 212 is invoked. Additional information regarding the waiting thread, or parameters received when Wait On Address API 212 was invoked, can also be included in the record.

Thread identification store 220 can be maintained in a variety of different manners. In one or more embodiments, thread identification store 220 is implemented as a hash table and corresponding hash buckets. Wait control module 216 generates a hash value for the waiting thread by applying a hash function to the target address. A variety of different conventional hash functions can be used by wait control module 216. The record of the waiting thread is stored in a hash bucket corresponding to the hash value, along with any other waiting threads that are waiting on a target address that hashes (by applying the hash function) to that same hash value. A hash bucket refers to any of a variety of different data structures that store the records corresponding to the hash value, such as a linked list of the records.

Alternatively, thread identification store 220 can be maintained in different manners, using a variety of different data structures. For example, thread identification store 220 can be an ordered list of records, each record including an identification of both the waiting thread and the target address. The list can be ordered by target addresses (e.g., from lowest address to highest address, from highest address to lowest address, and so forth), by waiting thread identifiers, and so forth.

Wait control module 216 also reads the current value at the target address, and determines whether the current value at the target address is the same as the current value observed by the waiting thread (provided by the waiting thread when invoking the Wait On Address API 212). If the current value at the target address is not the same as the current value observed by the waiting thread, then wait control module 216 assumes that another thread has changed the value at the target address after the waiting thread last accessed the memory location. Accordingly, the current value at the target address may be the value or within the range of values desired by the waiting thread. Thus, wait control module 216 removes the record of the waiting thread from thread identification store 220 and returns an indication to the waiting thread to recheck the value at the target address. This indication for the waiting thread to recheck the thread can be provided in different manners, such as a result code returned to the waiting thread by Wait On Address API 212 (e.g., returning a result code of "false" or "fail").

In one or more embodiments, wait control module 216 checks whether the current value at the target address is the same as the current value observed by the waiting thread and if not removes the record of the waiting thread from thread identification store 220 as an atomic operation. Performing these as an atomic operation ensures that another thread cannot change or modify the value at the target address between the time when wait control module 216 checks whether the current value at the target address is the same as the current value observed by the waiting thread and the time when wait control module 216 removes the record of the waiting thread to thread identification store 220.

It should be noted that, by checking whether the current value at the target address is the same as the current value observed by the waiting thread, wait control module 216 resolves potential race conditions without requiring the waiting thread to obtain any type of lock on the memory location. Wait control module 216 returns an indication to recheck the thread if the current value at the target address is not the same as the current value observed by the waiting thread, so if another application has modified the value at the memory location since the waiting thread checked the value the waiting thread is not waiting for a modification to the memory location that has already occurred.

However, if the current value at the target address is the same as the current value observed by the waiting thread, then wait control module 216 keeps the record of the waiting thread in thread identification store 220. In addition, if the current value at the target address is the same as the current value observed by the waiting thread, then the waiting thread is put to sleep. In one or more embodiments, wait control module 216 sends a request or message to a thread scheduling module of the operating system (e.g., operating system 104 of FIG. 1) to put the waiting thread to sleep. Alternatively, after invoking the Wait On Address API, the waiting thread itself can send a request or message to the thread scheduling module to put the waiting thread to sleep. The waiting thread can be put to sleep as soon as the waiting thread requests that it be put to sleep or as soon as wait control module 216 adds the record of the waiting thread to thread identification store 220, or alternatively the waiting thread can be put to sleep a particular amount of time (e.g., a particular number of milliseconds) after the waiting thread requests that it be put to sleep or after wait control module 216 adds the record of the waiting thread to thread identification store 220. Waiting this particular amount of time allows, for example, the waiting thread to not be put to sleep until after wait control module 216 has checked whether the current value at the target address is the same as the current value observed by the waiting thread.

In alternate embodiments, rather than adding the record of the waiting thread to thread identification store 220 and then checking whether the target address is the same as the current value observed by the waiting thread, wait control module 216 can check whether the target address is the same as the current value observed by the waiting thread before adding the record of the waiting thread to thread identification store 220. If the current value at the target address is the same as the current value observed by the waiting thread, then the record of the waiting thread is added to thread identification store 220; otherwise, the record is not added to thread identification store 220 and an indication is returned to the waiting thread to recheck the value at the target address. In such alternate embodiments, wait control module 216 can check whether the current value at the target address is the same as the current value observed by the waiting thread and add the record of the waiting thread to thread identification store 220 as an atomic operation.

In the discussions above, Wait On Address API 212 is discussed as having both a target address and a current value as parameters. In other embodiments, in addition to the current value, or alternatively in place of the current value, the waiting thread can provide a desired value parameter. The waiting thread indicates, via the desired value parameter thread, the value or range of values that the waiting thread desires to be at the target address. In such embodiments, wait control module 216 checks if the current value at the target address satisfies (e.g., is the same as or is within the range of values) the value or range of values that is desired by the waiting thread. If the current value at the target address does satisfy the value or range of values that is desired by the waiting thread, then wait control module 216 returns an indication to the waiting thread to recheck the value at the target address. However, if the current value at the target address does not satisfy the value or range of values that is desired by the waiting thread, then wait control module 216 keeps the record of the waiting thread in thread identification store 220. This record includes an indication of the value or range of values that is desired by the waiting thread.

When thread 206 modifies the value at a target address on which a thread is waiting (or may be waiting), thread 206 invokes Wake Address API 214. A thread invoking Wake Address API 214 is also referred to as a waking thread. Thread 206 does not typically have access to thread identification store 220, and thus is not aware of whether a thread is actually waiting on a particular target address. However, the developer of threads 204 and 206 are typically aware of different addresses that a thread may wait on, and accordingly designs threads 204 and 206 to invoke Wake Address API 214 when the value at such an address is modified (regardless of whether a thread is actually waiting on that address when Wake Address API 214 is invoked).

As part of invoking Wake Address API 214, the waking thread identifies, as one or more parameters of Wake Address API 214, an address. The actual address value can be included as a parameter of Wake Address API 214, or alternatively a pointer or reference to the address can be included as a parameter of Wake Address API 214. The address is the address of the memory location that the waking thread modified.

Wake Address API 214 provides the received one or more parameters to wake control module 218. In response to Wake Address API 214 being invoked, wake control module 218 checks thread identification store 220 to determine whether any threads are waiting on the address that was modified (the address identified as a parameter of the Wake Address API 214). The manner in which wake control module 218 checks thread identification store 220 to determine whether any threads are waiting on the address that was modified can vary based on the manner in which thread identification store 220 is implemented.

In one or more embodiments, in which thread identification store 220 is implemented as a hash table and corresponding hash buckets as discussed above, wake control module 218 generates a hash value by applying a hash function to the address that was modified. Wake control module 218 uses the same hash function (or a hash function that provides the same results) as the hash function that was used by wait control module 216. Wake control module 218 checks the hash bucket corresponding to the hash value to determine whether any records of waiting threads correspond to that hash value. If no records of waiting threads correspond to that hash value, then no threads are currently waiting on the address that was modified, and wake control module 218 need wake up no threads.

However, if one or more records of waiting threads correspond to that hash value, then wake control module 218 checks those one or more records to determine whether any of the waiting threads are waiting on the address that was modified. As multiple different addresses can (and typically do) correspond to the same hash value, wake control module 218 checks whether any of the waiting threads are waiting on the specific address that was modified. If one or more threads are waiting on the address that was modified, then at least one of those threads is selected by wake control module 218 and woken up.

In one or more embodiments, wake control module 218 sends a request or message to a thread scheduling module of the operating system (e.g., operating system 104 of FIG. 1) to wake up a particular thread that is sleeping. An identification of the waiting thread to be woken up can be included in the record for that waiting thread that is maintained in thread identification store 220. The thread scheduling module proceeds to wake up that particular thread, which can then recheck the value at the address for which the thread was waiting. When waking up a thread, wake control module 218 also removes, from thread identification store 220, the record of the waiting thread that module 218 is waking up.

In situations in which multiple threads are waiting on the address that was modified, wake control module 218 can wake up all of the multiple threads waiting on the address or alternatively a selected one or more of the multiple threads. Whether wake control module 218 is to wake up all of the multiple threads waiting on the address or a selected one or more of the multiple threads can be identified, for example, by the waking thread. For example, different Wake Address APIs 214 can be exposed, such as a Wake All API and a Wake Single API. If the Wake All API is invoked by the waking thread, then wake control module 218 wakes up all of the multiple threads waiting on the address. If the Wake Single API is invoked by the waking thread, then wake control module 218 wakes up one of the multiple threads waiting on the address. Alternatively, whether wake control module 218 is to wake up all of the multiple threads waiting on the address or a selected one or more of the multiple threads can be identified in other manners, such as being pre-configured in wake control module 218, being identified by the waking thread as a parameter of the Wake Address API, and so forth.

If wake control module 218 is to wake up fewer than all of the multiple threads waiting on the address, then the particular one or more threads that wake control module 218 is to wake up can be identified in a variety of different manners. For example, records of waiting threads can have an associated timestamp (e.g., provided by wait control module 216) in thread identification store 220 indicating when the thread began waiting (e.g., when the thread invoked Wait On Address API 212 or when the record was added to thread identification store 220), or can be stored in thread identification store 220 with an ordering indicating which threads began waiting before which other threads (e.g., a list of records in which the thread identified by an earlier record in the list began waiting before a thread identified by a later record in the list). In such situations, the thread that has been waiting the longest is the thread selected by wake control module 218 as the thread to wake up.

As discussed above, in one or more embodiments in addition to the current value, or alternatively in place of the current value, the waiting thread can provide a desired value parameter. In such embodiments, in addition to determining if one or more threads are waiting on the address that was modified, before waking a thread wake control module 218 also determines whether the current value at the address has the desired value or is within the range of values. An indication of the desired value or range of values is included in the record stored in thread identification store 220, and wake control module 218 can readily determine if the current value at the address has the desired value or is within the range of values. If the current value at the address has the desired value or is within the range of values then wake control module 218 wakes up the thread. However, if the current value at the address does not have the desired value or is not within the range of values, then wake control module 218 does not wake up the thread.

In one or more embodiments, Wait On Address API 212 is exposed using the format "WaitOnAddress", and includes at least a target address parameter that is the target address for which a thread is waiting as discussed above. The Wait On Address API 212 can also include a value parameter that is the current value that is observed by the waiting thread as being stored at the target address as discussed above. Additionally, the Wait On Address API 212 can include one or more of the following parameters: size, timeout, mask, desired value, and reason. One or more of these parameters can be provided by the waiting thread when invoking the Wait On Address API 212. When values for one or more of these parameters are provided by the waiting thread, the one or more values provided by the waiting thread are included in the record for the waiting thread that is maintained in thread identification store 220.

The size parameter is used to indicate a size of the value (e.g., in bits or bytes) of the value stored at the target address for which the thread is waiting. Using the size parameter allows wait control module 216 and wake control module 218 to know the size of the value that is stored at the target address. Alternatively, the size of the value can be inherent in the Wait On Address API. For example, one or more size-specific Wait On Address APIs can be used, such as a "WaitOnAddress-Byte" for values that are 8 bits in size, "WaitOnAddress-Word" for values that are 16 bits in size, and so forth.

The timeout parameter is used to indicate an amount of time (e.g., in milliseconds or seconds) after which the thread is to be woken up even if the target address on which the thread is waiting has not been modified. Wake control module 218 monitors the timeout values, and wakes up a waiting thread if a record of the thread is still included in thread identification store 220 after the amount of time (e.g., based on when the Wait On Address API 212 was invoked or the record was stored in thread identification store 220) indicated in the timeout parameter has lapsed.

The mask parameter is used to indicate a portion of the value stored at the target address that is of interest to the waiting thread. The portion of the value can be identified in different manners, such as a mask value that identifies particular bits of the value stored at the target address that are of interest to the waiting thread. If the target address is modified, wake control module 218 wakes up the waiting thread only if the portion of the value stored at the target address that is of interest to the waiting thread has been modified. Wake control module 218 can compare the current value at the target address to the value stored in the record maintained in thread identification store 220 for the waiting thread, and readily determine if the portion of the value that is of interest to the waiting thread has been modified. For example, the waiting thread can indicate that it is interested in the first, third, and sixth bits of the value at the target address. Accordingly, if the current value at the target address has different values for the first, third, and sixth bits than the value included in the record maintained in thread identification store 220, then the portion of the value stored at the target address that is of interest to the waiting thread has been modified. However, if the current value at the target address has the same values for the first, third, and sixth bits as the value included in the record maintained in thread identification store 220, then the portion of the value stored at the target address that is of interest to the waiting thread has not been modified.

The desired value parameter is used for the waiting thread to indicate that the current value at the target address is to have a particular value or be within a particular range of values in order for wake control module 218 to wake up the thread, as discussed above.

The reason parameter is used to indicate one or more reasons why the waiting thread is waiting on the target address. The reason parameter is similar to the desired value parameter, but differs in that the reason parameter specifies the reason that the thread is waiting rather than a particular value that the target address is to have or a particular range of values that the target address is to be within in order to be woken up. For example, the waiting thread can indicate that it is waiting on the target address because the value at the target address is not a zero value. When using the reasons parameter, before waking a thread wake control module 218 determines whether the reason specified by the waiting thread still exists. An indication of the reason is included in the record stored in thread identification store 220 by wait control module 216, and wake control module 218 can readily determine if the reason still exists (e.g., based on the current value at the target address). If the reason that the thread is waiting no longer exists, then wake control module 218 wakes up the thread. However, if the reason that the thread is waiting still exists, then wake control module 218 does not wake up the thread.

In one or more embodiments, Wake Address API 214 is exposed using the format "WakeAddress", and includes at least an address parameter that is the address that the waking thread modified as discussed above. The Wake Address API 214 can be implemented, for example, as a "WakeAll" API indicating that all threads waiting on the address that the waking thread modified are to be woken up, or as a "WakeSingle" API indicating that a single thread waiting on the address that the waking thread modified is to be woken up.

It should be noted that, in embodiments in which wait synchronization module 202 is implemented at least in part in hardware, wake control module 218 need not wait until Wake Address API 214 is invoked to wake up one or more threads. Rather, the hardware itself can detect when a particular memory location that one or more threads are waiting on has been modified, and wake up at least one of the waiting threads in response to detecting modification to that particular memory location. In such embodiments, Wake Address API 214 need not be exposed by wait synchronization module, and/or may be exposed but not result in any action performed by wait synchronization module 202 when invoked.

Figure 3:
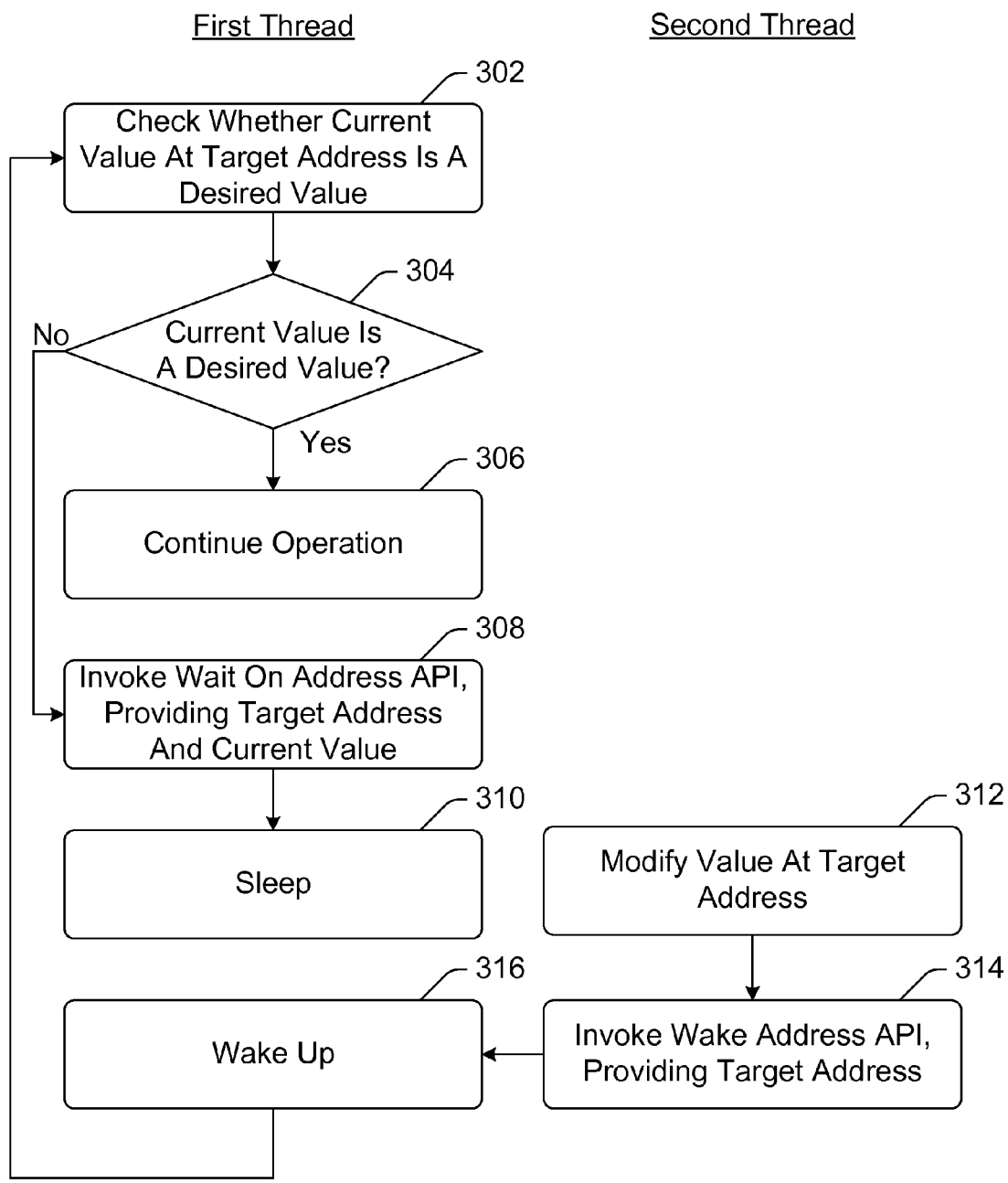
FIG. 3 is a flowchart illustrating an example process for using the wait on address synchronization interface in accordance with one or more embodiments.

FIG. 3 is a flowchart illustrating an example process 300 for using the wait on address synchronization interface in accordance with one or more embodiments. Process 300 can be implemented in software, firmware, hardware, or combinations thereof. Acts of process 300 illustrated on the left-hand side of FIG. 3 are carried out by a first thread, such as thread 204 of FIG. 2. Acts of process 300 illustrated on the right-hand side of FIG. 3 are carried out by a second thread, such as thread 206 of FIG. 2. Process 300 is shown as a set of acts and is not limited to the order shown for performing the operations of the various acts. Process 300 is an example process for using the wait on address synchronization interface; additional discussions of using the wait on address synchronization interface are included herein with reference to different figures.

In process 300, the first thread checks whether a current value at a target address is a desired value (act 302). This desired value can be a single value or a range of values as discussed above.

Process 300 proceeds based on whether the current value is a desired value (act 304). If the current value at the target address is a desired value, then operation of the thread continues (act 306). This continuing of operation refers to the thread continuing to execute whatever instructions are included in the thread after verifying that the current value at the target address is a desired value.

However, if the current value is not a desired value, then the first thread invokes a Wait On Address API (act 308). The first thread provides, as parameters of the Wait On Address API, an indication of both the target address (which is the address of the memory location that the first thread is waiting on) and the current value (which is the value observed by the waiting thread as being stored at the target address). Other parameters can also be provided, in addition to or in place of these parameters, as discussed above.

The first thread is then put to sleep (act 310). The first thread can put itself to sleep, or a module or component of the wait synchronization module can put the first thread to sleep as discussed above. Alternatively, as discussed above, if the value at the target address was changed after the check was made in act 302, the first thread can be kept awake, and return to act 302 to recheck whether the current value at the target address is a desired value.

The second thread modifies the value at the target address (act 312). This modification can be performed at different times, and typically is performed after the first thread is put to sleep in act 310.

After modifying the value at the target address, the second thread invokes a Wake Address API (act 314). The second thread provides, as a parameter of the Wake Address API, an indication of the address that the second thread modified (the target address in act 312).

In response to the Wake Address API being invoked, the first thread is woken up (act 316). Upon waking up, the first thread returns to act 302 to recheck whether a current value at a target address is a desired value. Process 300 then proceeds based on whether the first thread determines that the current value at the target address is a desired value as discussed above.

Figure 4:
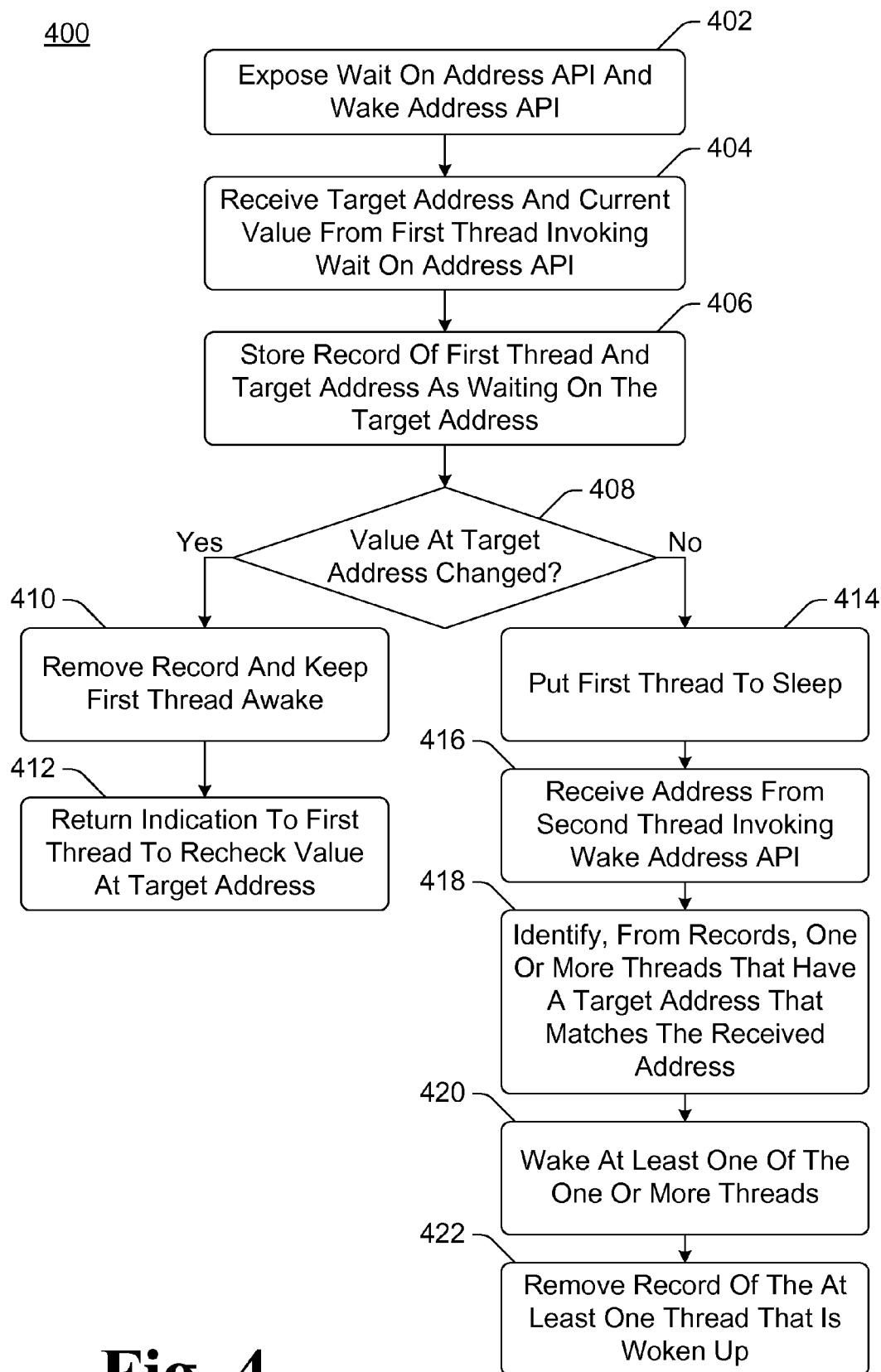
FIG. 4 is a flowchart illustrating an example process for implementing the wait on address synchronization interface in accordance with one or more embodiments.

FIG. 4 is a flowchart illustrating an example process 400 for implementing the wait on address synchronization interface in accordance with one or more embodiments. Process 400 is carried out by a wait synchronization module, such as wait synchronization module 202 of FIG. 2, and can be implemented in software, firmware, hardware, or combinations thereof. Process 400 is shown as a set of acts and is not limited to the order shown for performing the operations of the various acts. Process 400 is an example process for implementing the wait on address synchronization interface; additional discussions of implementing the wait on address synchronization interface are included herein with reference to different figures.

In process 400, a Wait On Address API and a Wake Address API are exposed (act 402).

A target address and current value are received from a first thread invoking the Wait On Address API (act 404). The target address and current value are received as parameters of the Wait On Address API as discussed above. Other parameters of the Wait On Address API can optionally be received, as discussed above.

A record of the first thread and the target address are stored, indicating that the first thread is waiting on the target address (act 406). This record can be stored in a data structure corresponding to a hash value generated from applying a hash value to the target address, as discussed above.

A check is made as to whether the value at the target address has changed (act 408). This check can be made, for example, by reading a current value at the target address and checking whether that value is the same as the current value received in act 404 as discussed above.

If the target address has changed, then the record of the first thread is removed from the stored records and the first thread is kept awake (act 410). The first thread is not put to sleep, and an indication is returned to the first thread to recheck the value at the target address (act 412). This rechecking is a checking of whether the current value at the target address is a desired value, as discussed above.

Returning to act 408, if the value at the target address has not changed, then the first thread is put to sleep (act 414).

Eventually, an address from a second thread is received as a parameter of the Wake Address API invoked by the second thread (act 416). One or more threads (if any) are identified, from the stored records, that have a target address that matches the address received in act 416. A thread in a stored record has a target address that matches the received address if, for example, the target address in the stored record is the same as the received address.

At least one of the one or more threads identified in act 418 are woken up (act 420). All threads identified in act 418 can be woken up, or alternatively only select threads can be woken up as discussed above. Additionally, the record of the at least one thread that is woken up is removed from the stored records (act 422).

Figure 5:
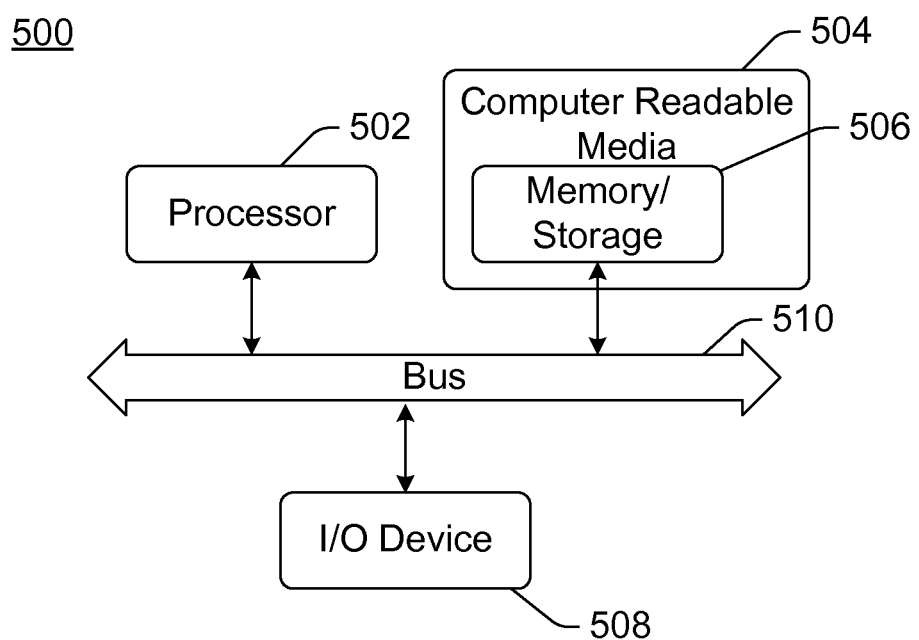
FIG. 5 illustrates an example computing device that can be configured to implement the wait on address synchronization interface in accordance with one or more embodiments.

FIG. 5 illustrates an example computing device 500 that can be configured to implement the wait on address synchronization interface in accordance with one or more embodiments. Computing device 500 can be, for example, computing device 100 of FIG. 1.

Computing device 500 includes one or more processors or processing units 502, one or more computer readable media 504 which can include one or more memory and/or storage components 506, one or more input/output (I/O) devices 508, and a bus 510 that allows the various components and devices to communicate with one another. Computer readable media 504 and/or one or more I/O devices 508 can be included as part of, or alternatively may be coupled to, computing device 500. Bus 510 represents one or more of several types of bus structures, including a memory bus or memory controller, a peripheral bus, an accelerated graphics port, a processor or local bus, and so forth using a variety of different bus architectures. Bus 510 can include wired and/or wireless buses.

Memory/storage component 506 represents one or more computer storage media. Component 506 can include volatile media (such as random access memory (RAM)) and/or nonvolatile media (such as read only memory (ROM), Flash memory, optical disks, magnetic disks, and so forth). Component 506 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 502. It is to be appreciated that different instructions can be stored in different components of computing device 500, such as in a processing unit 502, in various cache memories of a processing unit 502, in other cache memories of device 500 (not shown), on other computer readable media, and so forth. Additionally, it is to be appreciated that the location where instructions are stored in computing device 500 can change over time.

One or more input/output devices 508 allow a user to enter commands and information to computing device 500, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer readable memory devices, further description of which may be found with reference to FIG. 5. The features of the wait on address synchronization interface described herein are platform-independent, meaning that the wait on address synchronization interface can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
   exposing at least one function of a first application programming interface that, when invoked by a first thread of a process, receives from the first thread as parameters a target memory address and a current value observed by the first thread at the target memory address;
   checking, in response to the first application programming interface being invoked, whether the target memory address still has the current value observed by the first thread at the target memory address;
   in response to the target memory address not still having the current value observed by the first thread at the target memory address, returning to the first thread an indication to recheck the value at the target memory address;
   in response to the target memory address still having the current value observed by the first thread at the target memory address:
      maintaining a record of the first thread and the target memory address, allowing the first thread to be identified in response to a value at the target memory address being subsequently modified, and
      putting the first thread to sleep; and
   exposing at least one function of a second application programming interface that, when invoked by a second thread to indicate that a value at a memory address has been modified, receives from the second thread as a parameter of the second application programming interface the memory address that has been modified;
   checking whether the memory address received from the second thread matches the target memory address; and
   waking up the first thread in response to the memory address received from the second thread matches the target memory address.

2. A method as recited in claim 1, further comprising:
   receiving, from the first thread, an indication of a desired value or desired range of values at the target memory address;
   checking, in response to the first application programming interface being invoked, whether a value at the target memory address is the desired value or is within the desired range of values; and
   if the target memory address is the desired value or is within the desired range of values, then returning to the first thread an indication to recheck the value at the target memory address, otherwise putting the first thread to sleep.

3. A method as recited in claim 1, the maintaining the record of the first thread and the target memory address comprising:
   generating a hash value by applying a hash function to the target memory address; and
   storing, in a data structure corresponding to the hash value, both an indication of the first thread and an indication of the target memory address.

4. A method as recited in claim 1, the checking whether the memory address received from the second thread matches the target memory address comprising:
   generating a hash value by applying a hash function to the memory address received from the second thread;
   checking, in a data structure corresponding to the hash value, whether the data structure has a record including an indication of the target memory address; and
   determining that the memory address received from the second thread matches the target memory address only if the data structure has a record including an indication of the target memory address.

5. A method as recited in claim 1, the second application programming interface comprising a Wake Single application programming interface, the first thread being one of multiple threads waiting for the target memory address to be modified, and the method further comprising:
   waking up, in response to the Wake Single application programming interface being invoked, the first thread but not the other threads of the multiple threads.

6. A method as recited in claim 1, the second application programming interface comprising a Wake All application programming interface, the first thread being one of multiple threads waiting for the target memory address to be modified, and the method further comprising:
   waking up, in response to the Wake All application programming interface being invoked, all of the multiple threads waiting for the target memory address to be modified.

7. A method as recited in claim 1, the first thread and the second thread being threads of the same process.

8. A method as recited in claim 1, the method further comprising receiving, from the first thread when the first application programming interface is invoked, a size of the current value.

9. A method as recited in claim 1, the method further comprising receiving, from the first thread when the first application programming interface is invoked, a timeout value indicating when the first thread is to be woken up even if the value at the target memory address is not subsequently modified.

10. A method as recited in claim 1, the method further comprising receiving, from the first thread when the first application programming interface is invoked, an indication of a portion of the value at the target memory address that is of interest to the first thread, the method further comprising:
   checking whether the memory address received from the second thread matches the target memory address;
   determining whether the portion of the value at the target memory address that is of interest to the first thread has been modified; and
   waking up the first thread only if both the memory address received from the second thread matches the target memory address and the portion of the value at the target memory address that is of interest to the first thread has been modified.

11. One or more computer storage media hardware devices having stored thereon multiple instructions that, when executed as a first thread of a process by one or more processors of a computing device, cause the one or more processors to:
- determine that a current value at a target memory address is not a desired value;
- invoke, in response to the current value at the target memory address not being the desired value, at least one function of a first application programming interface to indicate that the first thread is to sleep and be woken up when a second thread modifies at least a portion of the value at the target memory address, including identifying as parameters of the first application programming interface for use in the execution of the at least one function the target memory address and the current value at the target memory address;
- receive, in response to invoking the at least one function of the first application programming interface, an indication to recheck whether the current value at the target memory address is the desired value before the first thread is put to sleep; and
- invoke the first application programming interface again using the parameters if the current value at the target memory address is still not the desired value.

12. One or more computer storage media hardware devices as recited in claim 11, the instructions causing the one or more processors to invoke the first application programming interface further comprising instructions causing the one or more processors to identify the desired value as a parameter of the first application programming interface.

13. One or more computer storage media hardware devices as recited in claim 11, the instructions causing the one or more processors to invoke the first application programming interface further comprising instructions causing the one or more processors to identify a size of the current value as a parameter of the first application programming interface.

14. One or more computer storage media hardware devices as recited in claim 11, the instructions causing the one or more processors to invoke the first application programming interface further comprising instructions causing the one or more processors to identify a timeout value as a parameter of the first application programming interface, the timeout value indicating when the first thread is to be woken up even if the value at the target memory address is not subsequently modified.

15. One or more computer storage media hardware devices as recited in claim 11, the second thread being a thread of the process.

16. One or more computer storage media hardware devices as recited in claim 11, the first thread being one of multiple threads of the process waiting to be woken up when the value at the target memory address is modified.

17. A computing device comprising:
- one or more processors; and
- one or more computer readable media having stored thereon multiple instructions that, when executed by the one or more processors, cause the one or more processors to perform acts comprising:
  - exposing at least one function of a first application programming interface that, when invoked by a first thread of a process, receives from the first thread as parameters a target memory address and a current value observed by the first thread at the target memory address;
  - checking, in response to the first application programming interface being invoked, whether the target memory address still has the current value observed by the first thread at the target memory address;
  - in response to the target memory address not still having the current value observed by the first thread at the target memory address, returning to the first thread an indication to recheck the value at the target memory address;
  - in response to the target memory address still having the current value observed by the first thread at the target memory address:
    - maintaining a record of the first thread and the target memory address, allowing the first thread to be identified in response to a value at the target memory address being subsequently modified, and putting the first thread to sleep; and
  - exposing at least one function of a second application programming interface that, when invoked by a second thread to indicate that a value at a memory address has been modified, receives from the second thread as a parameter of the second application programming interface the memory address that has been modified;
  - checking whether the memory address received from the second thread matches the target memory address; and
  - waking up the first thread in response to the memory address received from the second thread matches the target memory address.

18. A computing device as recited in claim 17, the acts further comprising:
- receiving, from the first thread when the first application programming interface is invoked, a timeout value; and
- waking up the first thread after the timeout value amount of time has passed regardless of whether the target memory address is modified.

19. A computing device as recited in claim 17, the acts further comprising:
- receiving, from the first thread, an indication of a desired value or desired range of values at the target memory address;
- checking, in response to the second application programming interface being invoked, whether a value at the target memory address is the desired value or is within the desired range of values; and
- waking up the first thread only if both the memory address received from the second thread matches the target memory address and the value at the target memory address is the desired value or is within the desired range of values.

20. A computing device as recited in claim 17, the first thread being one of multiple threads waiting for the target memory address to be modified, and the acts further comprising waking up, in response to the second application programming interface being invoked, the first thread but not the other threads of the multiple threads.

* * * * *